United States Patent
Akinyele et al.

(10) Patent No.: US 9,209,974 B1
(45) Date of Patent: Dec. 8, 2015

(54) FUNCTIONAL ENCRYPTION KEY MANAGEMENT

(71) Applicant: Zeutro LLC, Austin, TX (US)

(72) Inventors: Joseph Ayo Akinyele, Owings Mills, MD (US); Matthew Daniel Green, Baltimore, MD (US)

(73) Assignee: Zeutro, LLC, Austin, TX (US)

( * ) Notice: Subject to any disclaimer, the term of this patent is extended or adjusted under 35 U.S.C. 154(b) by 0 days.

(21) Appl. No.: 14/702,733

(22) Filed: May 3, 2015

(51) Int. Cl.
*H04L 9/30* (2006.01)
*H04L 9/14* (2006.01)
*H04L 9/08* (2006.01)

(52) U.S. Cl.
CPC ............... *H04L 9/30* (2013.01); *H04L 9/0819* (2013.01); *H04L 9/14* (2013.01)

(58) Field of Classification Search
CPC ............ H04L 9/30; H04L 9/14; H04L 9/0819
See application file for complete search history.

(56) References Cited

U.S. PATENT DOCUMENTS

| 8,516,244 | B2 | 8/2013 | Waters | |
|---|---|---|---|---|
| 2004/0120525 | A1 | 6/2004 | Miskimmin et al. | |
| 2012/0163588 | A1* | 6/2012 | Kobayashi | H04L 9/3073 380/28 |
| 2012/0300936 | A1* | 11/2012 | Green | H04L 9/3073 380/278 |
| 2013/0028415 | A1* | 1/2013 | Takashima | H04L 9/0847 380/44 |

OTHER PUBLICATIONS

Amit Sahai and Brent Waters. Fuzzy identity-based encryption. In EUROCRYPT, pp. 457-473, 2005.
Vipul Goyal, Omkant Pandey, Amit Sahai, and Brent Waters. Attribute-based encryption for fine-grained access control of encrypted data. In ACM Conference on Computer and Communications Security (CCS), pp. 89-98, 2006.
Allison B. Lewko and Brent Waters. Decentralizing attribute-based encryption. In EUROCRYPT, pp. 568-588, 2011.

(Continued)

*Primary Examiner* — Jung Kim
*Assistant Examiner* — Thomas Ho
(74) *Attorney, Agent, or Firm* — CipherLaw

(57) ABSTRACT

Functional encryption keys can be selected based on a set of criteria that facilitates efficient decryption of ciphertexts. The method includes electronically storing one or more decryption key metadata parameters for a plurality of candidate decryption keys for a functional encryption ciphertext, storing a functional encryption ciphertext, extracting a scheme type of functional input from the ciphertext, extracting a functional input from the ciphertext, searching the metadata parameters to identify a set of candidate keys matching the scheme type of the ciphertext, searching the set of candidate keys to identify a key matching the extracted functional input, and selecting one of the identified candidate keys matching the scheme type and the extracted functional input as a decryption key for the functional encryption ciphertext.

30 Claims, 5 Drawing Sheets

```
1  function searchKey(keystore, ciphertext, query):
2      T = getFunctionInputType( ciphertext ) // extract the functional input type
3      A = filterKeys( T, keystore ) // filter keys based on func_type
4      F = getFunctionInput( ciphertext ) // extract the functional input itself
5      // further rank and filter keys in order of relevance to query/metadata
6      B = rankAlgorithm( A, query, keystore )
7      // test and evaluate each candidate key
8      for all y ∈ B
9          if testKey( y, F ) // determine if key satisfies the functional input
10             return y
11         end if
12     end for
13     // no key satisfied the query so return a key request
14     return constructKeyRequest( ciphertext, query )
15 end function
```

(56) References Cited

OTHER PUBLICATIONS

John Bethencourt, Amit Sahai and Brent Waters. Ciphertext-Policy attribute-based encryption. 28th IEEE Security & Privacy (IEEE S&P), pp. 321-324, 2007.

Dan Boneh, Amit Sahai and Brent Waters. Functional Encryption: Definitions and Challenges. Theory of Cryptography Conference (TCC), 2011.

Brent Waters. Ciphertext-Policy, Attribute-based Encryption: An Expressive, Efficient, and Provably Secure Realization. Public-Key Cryptography (PKC), pp. 53-70, 2011.

Allison Lewko, Amit Sahai and Brent Waters. Revocation Systems with Very Small Private Keys. 31st IEEE Security & Privacy (IEEE S&P), pp. 273-285, 2010.

Leonardo De Moura and Nikolaj Bjorner. Z3: An Efficient SMT Solver. Proceedings of the Theory and Practice of Software (ETAPS), pp. 337-340, 2008.

Sanjam Garg, Craig Gentry, Shai Halevi, Mariana Raykova, Amit Sahai and Brent Waters. Candidate Indistinguishability Obfuscation and Functional Encryption for all circuits. IEEE Symposium on Foundations of Computer Science (FOCS), pp. 40-49, 2013.

* cited by examiner

Fig. 2

```
1  function searchKey(keystore, ciphertext, query):
2      T = getFunctionInputType( ciphertext ) // extract the functional input type
3      A = filterKeys( T, keystore ) // filter keys based on func_type
4      F = getFunctionInput( ciphertext ) // extract the functional input itself
5      // further rank and filter keys in order of relevance to query/metadata
6      B = rankAlgorithm( A, query, keystore )
7      // test and evaluate each candidate key
8      for all y ∈ B
9          if testKey( y, F ) // determine if key satisfies the functional input
10             return y
11         end if
12     end for
13     // no key satisfied the query so return a key request
14     return constructKeyRequest( ciphertext, query )
15 end function
```

Fig. 3

```
1  function TestKeyNode( node, S ) // node = root of tree, S = set of attributes
2      if isLeaf( node )
3          x ← getAttribute( node )
4          if isElementOf( x, S ) then return true // if attribute node an element of S
5          else return false
6      else // recursively check each child node and store output in result array
7          for all x in childNodes( node )
8              result[ x ] = TestKeyNode( x, S )
9          end for
10     // check whether AND or OR gate node
11     if isAndGate( node ) // output true if all recursive calls were true
12         if oneFalse( result ) then return false
13         else return true
14     else if isOrGate( node ) // output true if one of recursive calls is true
15         if allFalse( result ) then return false
16         else return true
17 end function
```

Fig. 4

Counting Pairing Operations

```
1  function EvalNodeCount( node, S ) // node = root of tree, S = set of attributes
2     if isLeaf( node )
3        x ← getAttribute( node )
4        if isElementOf( x, S ) then return ( true, 1 ) // if attribute x an element of S
5        else return ( false, 0 )
6     else // recursively check each child node and store output in result array
7        for all x ∈ childNodes( node )
8           result[ x ] = EvalNodeCount( x, S )
9        end for
10    // check whether AND or OR gate node
11    if isAndGate( node ) // output true if all recursive calls were true
12       if oneFalse( result ) then return ( false, 0 )
13       else return ( true, sumOfIntegers(result) ) // sum of all children integers
14    else if isOrGate( node ) // output true if one of recursive calls is true
15       if allFalse( result ) then return ( false, 0 )
16       else return ( true, minOfIntegers(result) ) // minimum of all children integers
17 end function
```

Fig. 5

Counting Pairing Operations Per Unique Attribute

```
1 function EvalNodeSet( node, S ) // node = root of tree, S = set of attributes
2    if isLeaf( node )
3        x ← getAttribute( node )
4        if isElementOf( x, S ) then return ( true, {x} ) // if attribute x an element of S
5        else return ( false, { } ) // the emptyset
6    else // recursively check each child node and store output in result array
7        for all x ∈ childNodes( node )
8            result[ x ] = EvalNodeSet( x, S )
9        end for
10   // check whether AND or OR gate node
11   if isAndGate( node ) // output true if all recursive calls were true
12       if oneFalse( result ) then return ( false, { } ) // the emptyset
13       else return ( true, unionOfSets(result) ) // union of all children sets
14   else if isOrGate( node ) // output true if one of recursive calls is true
15       if allFalse( result ) then return ( false, { } )
16       else return ( true, smallestSet(result) ) // smallest set of all children sets
17 end function
```

FUNCTIONAL ENCRYPTION KEY MANAGEMENT

FIELD OF THE INVENTION

The present invention relates to methods, systems, and machine-readable media for an integrated environment for encryption key management, and furthermore, for efficiently identifying and retrieving a functional encryption key.

BACKGROUND OF THE INVENTION

Many information systems need to transmit and store data securely, in a manner such that only authorized users may access it. One common approach to solving this problem is to use encryption. Encryption devices accept data to be encrypted along with an encryption key, and produce a resulting value known as a ciphertext. A system in possession of an associated decryption key may process the ciphertext to obtain the original data.

Most deployed encryption systems use one of two categories of encryption. Secret key (or "symmetric key") encryption systems use the same key for both encryption and decryption of data. Public-key (or "asymmetric") encryption systems use two associated keys, known as a "public key" and a "private key" (or "decryption key"), together known as a "key pair". In these systems, exemplified by the RSA algorithm, the public key is useful only to encrypt data, and may thus be distributed widely. The corresponding private key may be held secret by the recipient and is used only to decrypt data. Public-key encryption solves one of the central problems arising in modern encryption systems: the ability to exchange information securely without a priori shared secrets.

In deployments today, the practical challenge for public-key encryption systems is the need to securely distribute public keys. Various approaches to solving this problem have been proposed. One approach is to use a Public Key Infrastructure (PKI), which includes trusted parties that certify the authenticity of various public keys. This approach has been successful for applications such as encrypted network communications (e.g., IPSec, SSL/TLS) and email (S/MIME).

However, limitations of the prior art may arise in data sharing scenarios. With standard public and symmetric key encryption systems, a transmitter must obtain the encryption key for each recipient to which it wishes to encrypt. For example, encrypting a record to all members of the "Accounting" group at a company requires that the encryptor obtain the public key for each member of the group prior to encrypting. Moreover, this encryption applies only to the members of the group at the time of encryption and if the membership of the group increases subsequent to encryption, new group members will be unable to decrypt the record.

With recent advances in public-key cryptography, a new approach for protecting data has arisen. Functional Encryption (FE) provides a new method for encrypting data in which encryptors do not encrypt to keys, or even to specific users, but instead embed a complex access predicate into the ciphertext or key itself. These predicates can be thought of as an access control program that enforces role-based or content-based controls on who may access content, and can possibly offer the decryptor different views of the encrypted content.

In ciphertext-policy Attribute-Based Encryption, a central authority provides recipients with keys that may embed textual attributes, e.g., "Accounting", "Management" or "Top Secret". Encryptors associate each ciphertext with an access policy might be computed as a Boolean formula over these textual attributes, e.g., "(Accounting AND Management) OR (Top Secret AND (Accounting OR Management))". This formula specifies that the corresponding ciphertexts may only be decrypted by a key containing sufficient attributes to satisfy the formula associated with the ciphertext. In CP-ABE schemes, the decryption algorithm either produces the original message or fails to decrypt entirely.

In other, more general embodiments of FE, ciphertexts encrypt a message x and keys can be issued that embed any function F. Using the private key associated with F to decrypt an encryption of the message x, reveals the value F(x), that is the function F applied to the input x, and nothing else about x. Hence in Functional Encryption schemes, data access is self-enforcing from the cryptography and does not require a trusted mediator. More broadly, Functional Encryption provides a powerful capability for enforcing fine-grained access control.

The existence of ABE and general Functional Encryption schemes creates a new problem. In traditional public key and symmetric encryption schemes, there is generally a single decryption key corresponding to each encryption key that may have been used to generate a ciphertext. Hence, even where a decryption device stores multiple decryption keys, the decryptor is generally assured that at most one key will be useful in decrypting a given ciphertext. To simplify the decryption process, many encryption tools (e.g., PGP Mail, S/MIME) attach an associated key identifier to each ciphertext, in order to clearly indicate which decryption key should be used.

Existing encryption libraries rely fundamentally on this one-to-one mapping of encryption and decryption keys, and provide key management functions to store and manipulate decryption keys. For example, OpenSSL provides support for managing multiple keys on smart cards or hardware security modules, OpenPGP includes a mechanism for managing a set of uniquely identified keys on a client's machine via a keyring application, and the Keyczar library enables rotating and revoking keys on a client's system. These existing systems provide a keystore mechanism (such as a keyring) and enable decryption of ciphertexts by matching the fingerprint on a key within a keystore to the corresponding ciphertext.

In Functional Encryption deployments, on the other hand, there may exist multiple distinct decryption keys that are capable of decrypting a given ciphertext. For example, in a CP-ABE system, a ciphertext containing the policy "(Accounting AND Management) OR (Top Secret AND (Accounting OR Management))" may be decrypted by at least three decryption keys. This includes any key containing the attributes ("Accounting", "Management") or ("Accounting", "Top Secret") or ("Management", "Top Secret"). Moreover, additional decryption keys may exist where other attributes are included in the key.

In the example of a KP-ABE system, a ciphertext may contain the attributes "Computer Science", "Professor", "Research", and "Management". Several decryption keys can be constructed with a variety of access policies that these attributes on the ciphertext could satisfy: ("Computer Science" AND "Professor"), (("Research" OR "Management") AND "Computer Science") and so on. Similarly to CP-ABE, additional decryption keys may exist where other attributes are included in the policy associated with the key.

In the example of a MA-ABE system, a ciphertext may contain the policy such as "(Accounting AND Management) OR (Top Secret AND (Accounting OR Management))" similar to a single authority CP-ABE system. Constructing decryption keys in this setting may involve interacting with one or more key authorities. Not only can there be multiple distinct decryption keys to satisfy the policy, but also any number of possible authority combinations to produce a single decryption key.

In the example of a general FE system, a decryption key associated with function F and a decryption key associated with function G may decrypt a ciphertext encrypting message x to give two different values, F(x) and G(x).

Thus, a challenge in designing devices that implement Functional Encryption schemes including CP-ABE, KP-ABE, or MA-ABE is that devices may possess many different decryption keys that have some overlapping characteristics, or have different conditions for which they may be used. Moreover, different keys may yield different decryption times or possibly different views of the content. Therefore, upon receipt of a ciphertext, the user or device must select one key to use in decrypting the ciphertext.

One approach to selecting the decryption key is to simply attempt decryption of the ciphertext with each available key; however this is undesirable due to the high computational cost of these tests. Alternatively, the user might be asked to make this decision manually. However, requiring the user to make this decision presents a significant overhead for Functional Encryption. Moreover, at the end of this search process, users could find that they don't possess the necessary key to decrypt. In such cases, users would need to obtain the appropriate credentials from a key authority or key server. Alternatively, at the end of the search process, the user might discover multiple keys that will decrypt the ciphertext, but the decryption process may be more time consuming or resource-intensive when conducted with some keys than with others.

These scenarios highlight the challenges that end users have to overcome to manage their own Functional Encryption keys. Furthermore, this is coupled with the lack of existing services to help users manage their multiple Functional Encryption keys in practical deployments. Accordingly, there is a need for systems to identify an appropriate Functional Encryption decryption key, particularly in situations where multiple keys may exist that can correctly decrypt a ciphertext.

BRIEF SUMMARY OF THE INVENTION

The present invention includes systems and methods for identifying and retrieving Functional Encryption (FE) keys. The systems and methods described herein may be applied to any generalized Functional Encryption, including those where the decryptor may possibly obtain different views of the encrypted content with different keys, as well as limited forms of Functional Encryption such as, but not limited to, ciphertext-policy Attribute-Based Encryption (CP-ABE), key-policy attribute-based encryption (KP-ABE) and multi-authority attribute-based encryption (MA-ABE).

The systems and methods described herein may include some or all of the following embodiments:

In one embodiment of the invention, the system can be configured so that it (a) stores information about a plurality of FE keys, (b) accepts information about one or more ciphertexts to be decrypted, (c) searches the keys or key information in its storage, (d) returns one or more keys or references to keys.

In another embodiment of the invention, the system can be configured for retrieving the FE keys from a database, stored in memory or on a storage device such as a disk.

In another embodiment of the invention, the system can be configured for selecting FE keys based on certain criteria with respect to the functional input type of the key. This criteria might include the type of encryption used to encrypt the ciphertext, e.g., CP-ABE, KP-ABE, MA-ABE or additional parameters of the encryption algorithm used. The invention can also include a method for selecting keys based on one or more ciphertexts to be decrypted.

In another embodiment of the invention, the system can be configured for choosing FE keys that satisfy one or more search criteria and may include an option to cache the keys for possible use later.

In another embodiment of the invention, the system can be configured for identifying when none of the current keys within a user's keyring are appropriate to decrypt an object.

In another embodiment of the invention, the system operates where the keys correspond to various types of functional encryption algorithms. For example, there are two variants of attribute-based encryption (a specialization of functional encryption): Ciphertext-Policy and Key-Policy. The ciphertext-policy formulation enables role-based access control whereby attributes are associated with the user's key and access policy formulas are associated with the ciphertext. The attributes on the user's key must satisfy the policy on the ciphertext for the user to decrypt successfully. The key-policy formulation enables content-based access control and reverses this relationship by placing the attributes on the ciphertext and the policy on the key.

In another embodiment of the invention, the system can be configured for identifying redundant (or related keys) such that keys can be categorized accordingly and cached for specific purposes.

In one example embodiment, a method for selecting a decryption key for decrypting a functional encryption ciphertext comprises electronically storing one or more decryption key metadata parameters for a plurality of candidate decryption keys for a functional encryption ciphertext; storing a functional encryption ciphertext, wherein either: an access control function is embedded with the ciphertext during encryption and an attribute set is embedded with a decryption key; or the attribute set is embedded with the ciphertext during encryption and the access control function is embedded with the decryption key; extracting a scheme type of functional input from the ciphertext, wherein the scheme type is one of ciphertext-policy, key-policy, or multi-authority; extracting a functional input from the ciphertext; searching the metadata parameters to identify a set of candidate keys matching the scheme type of the ciphertext; searching the set of candidate keys to identify a key matching the extracted functional input; and selecting one of the identified candidate keys matching the scheme type and the extracted functional input as a decryption key for the functional encryption ciphertext.

BRIEF DESCRIPTION OF THE DRAWINGS

FIG. 2 illustrates example instructions for a key search method.

FIG. 3 illustrates example instructions for a key test method.

FIG. 4 illustrates example instructions for a decryption cost evaluation method.

FIG. 5 illustrates example instructions for a decryption cost evaluation method operating on each unique attribute.

DETAILED DESCRIPTION

Figure 1:
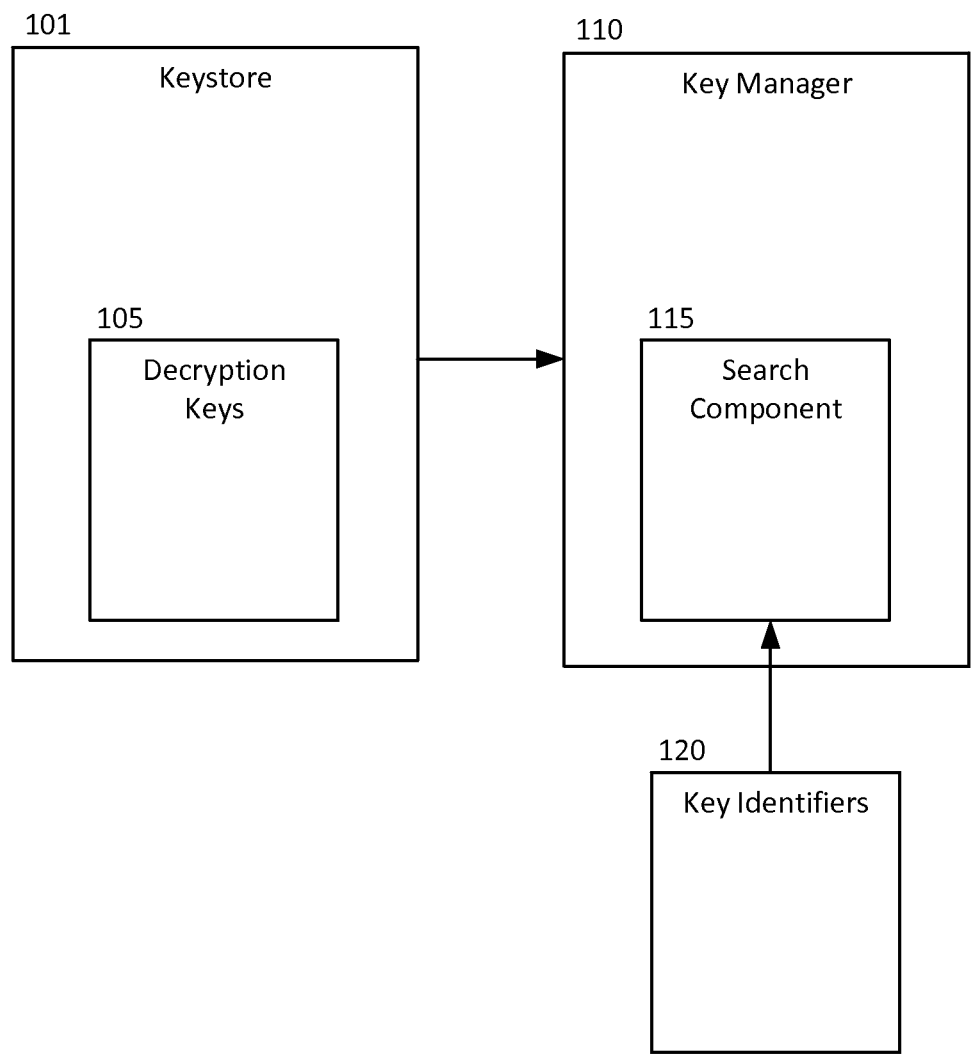
FIG. 1 illustrates an example system for managing and identifying functional encryption keys.

In the following description of embodiments, reference is made to the accompanying drawings which form a part hereof, and in which it is shown by way of illustration specific embodiments of claimed subject matter. It is to be understood that other embodiments may be used and changes or alterations, such as structural changes, may be made. All embodiments, changes or alterations are not departures from scope with respect to intended claimed subject matter. While the steps below may be presented in a certain order, in some cases the ordering may be changed so that certain inputs are provided at different times or in a different order without changing the function of the systems and methods described. The procedures described herein could also be executed in different orders. Additionally, various computations that are described below need not be performed in the order disclosed and other embodiments using alternative orderings of the computations could be readily implemented. In addition to being reordered, the computations could also be decomposed into sub-computations with the same results.

Functional Encryption provides a means to encrypt data objects according to a policy, ensuring that only authorized individuals can obtain protected data. This technique greatly simplifies the problem of securing data at rest, but also creates new challenging problems. The most notable problem is the need to securely manage Functional Encryption keys on a client's system to enable efficient decryption of data objects.

The systems and methods described herein can be applied to general Functional Encryption (as described by, e.g., Garg, Gentry, Halevi, Raykova, Sahai and Waters) as well as a special case of Functional Encryption called Attribute-based encryption (ABE). As non-limiting examples, the invention may be applied to variants of ABE such as Ciphertext-policy and Key-policy ABE. In a Ciphertext-policy ABE system (as described by, e.g., Bethencourt, Sahai and Waters), a user's private key has a set of descriptive attributes associated with it. Moreover, a ciphertext has an embedded access structure or policy such that the attributes on the key must satisfy the policy in order to decrypt. Since these attributes on the private key can be personalized for a particular user, CP-ABE enforces the essence of role-based access control. Conversely, in a Key-policy ABE system (as described by, e.g., Goyal, Pandey, Sahai and Waters), each user's private key has an access policy associated with it. Each ciphertext is embedded with a set of descriptive attributes. If the attributes on the ciphertext satisfy the policy on the key, then the user is able to decrypt. Since the descriptive attributes can be representative of the underlying data, one can view KP-ABE as enforcing content-based access control.

Alternatively, multi-authority ABE (e.g., Lewko and Waters) enables FE and ABE systems where multiple organizations distribute credentials and their corresponding private keys for their own domain.

Some embodiments described herein may be applied to FE schemes in which a client's system is equipped with a keystore (e.g., in-memory or on disk) and has the ability to store multiple keys for various types of FE (including different types of ABE). Additionally, the system provides a means for obtaining ciphertexts via a network media. The system provides a means for evaluating, analyzing ciphertexts and metadata associated with them. Similarly, the system provides a means for obtaining, analyzing, evaluating keys via a network media and the metadata associated with them. The invention can include a method by which a client system can search locally or remotely for an optimal FE key that allows the user to decrypt a given ciphertext. After the search process, if it is determined that no such key exists, then a request will be made to the key server for such a key.

Modules and Components

With reference to FIG. 1, the system can include a keystore (101) for one or more keys (105), key identifiers (120), a key manager module (110), and a search component (115) as described in more detail below.

Keystore

The keystore provides management of various FE key types. This service enables enumeration of keys and retrieval of keys by reference (e.g., a string or index identifier). It can include an ability to store keys per type (private or public) with arbitrary associated metadata.

The keystore can be embodied in the form of an electronic data store that represents references to FE keys and their corresponding metadata. As a non-limiting example, the keystore may be in represented the form of a series of key/value hash maps for efficient lookup. The keystore database can also be accessed on disk or over a local network. In a preferred embodiment, the storage could either be in the form of a lightweight relational database (e.g., Sqlite) or non-relational database (e.g., NoSQL). A key can refer to a metadata structure which describes details about the FE key. The metadata structure can be used to streamline how a key can be organized, queried and efficiently managed by users and applications. This metadata structure is collected during loading of a decryption key and can be managed in a variety of ways depending on the choice of database storage. As a non-limiting example, the metadata could be stored in an on-disk database as a set of fields in a table and identified by a unique key reference. As a further non-limiting example, the metadata structure could be stored in memory as an object and identified by a key reference string or integer in a hash map.

As non-limiting examples, contents of the metadata structure can include, but are not limited to key type, time of key creation, key expiration, and list of one or more descriptive textual attributes (if CP-ABE or MA-ABE key) or a policy string (if KP-ABE). The key metadata may include other information such as, but not limited to, a descriptive string identifier of the user's choice or a numerical identifier. This structure may include links or references to other keys that might be appropriate to a particular search criterion. For example, this might include other keys with similar attributes as the key in question or other relevant information. Similarly, the structure may include whether the key is designated for cache storage for offline use (e.g., in the event the client loses network connectivity). Users and/or applications can query any field in the metadata structure.

Ciphertext or a Set of Ciphertexts

The system can store or reference a ciphertext or a set of ciphertexts that corresponds to any functional encryption scheme type and the associated metadata which may comprise of an access policy or list of one or more attributes, a time of creation, a set of user identifiers, or other atttributes.

Key or a Set of Keys

The system can store or reference a key or a set of keys that can correspond to a particular functional encryption scheme type along with arbitrary metadata. As described above, this metadata can include, but is not limited to, an access policy or list of attributes, a time of creation, expiration, and user identifiers. This key structure is understood by the keystore and can be stored and referenced by string or numerical identifiers in an electronic data store, including a database.

Key Manager

The key manager module takes as input a keystore (in some cases comprising a set of keys), functional inputs (and associated metadata) corresponding to a ciphertext or a set of ciphertexts, and one or more key identifiers. The manager can include a search component for searching on the key identifiers or key metadata that describes attributes of key being searched. As non-limiting examples, these attributes can include: date ranges, a list of one or more possible attributes in the policy, and efficiency of decryption. The search algorithm can then execute and return a reference to a candidate key. The user or calling application can then utilize the key to decrypt the data object. This module also may feature a set of algorithms for performing a number of operations on the keystore, such as but not limited to, storing keys, updating keys, and searching for keys that are related or that have expired (for the purposes of pruning the keystore). The key manager module can be programmed by an application to execute periodically and/or in response to certain system events such as the reception of ciphertexts via the network.

Overview of Key Search Process

In a preferred embodiment, the search process can be configured for: (1) storing multiple decryption keys and associated metadata into the keystore and optionally, executing pre-processing algorithms on the those keys. It can also operate by receiving one or more ciphertexts and a search query as input and (2) processing said ciphertext against the available keys and associated metadata in the keystore. Then, (3) make a determination if any key satisfies the ciphertext and the search query. The process will return the key that satisfies both the ciphertext and query and, if no such key is found, optionally formulate a request to a key server for the new decryption key.

Search Algorithm

The example instructions of FIG. 2 illustrate the structure of a search process for some or all functional encryption scheme types. The objective of the algorithm is to determine the optimal decryption key that satisfies the ciphertext and a given search criteria. The first step of the algorithm is to extract the type of functional input from the ciphertext, whether it corresponds to a CP-ABE, KP-ABE, MA-ABE or a general FE scheme type. The type of functional input narrows the candidate set of keys in the keystore. Once the candidate keys and associated metadata have been retrieved by reference for a specific FE type, the functional input is then extracted from the ciphertext. Depending on the query, the system can then optionally apply a ranking algorithm on the candidate keys based on a number of factors including, but not limited to, efficiency, time period, and a subset of attributes.

At this stage, test and evaluation procedures can be performed. For example, the search component can determine the optimal key by executing the decryption algorithm on the input ciphertext with candidate keys. Then, the search returns the first key that successfully decrypts the ciphertext. Instead of executing the decryption algorithm, an alternative approach can be performed by executing a test key algorithm on the ciphertext and the keys. One embodiment of a test key algorithm is illustrated in FIG. 3. Furthermore, the test key algorithm can be augmented by using the pre-processing steps, described below, during initial key storage and/or processing of the ciphertext.

Pre-Processing Keys in Keystore

As decryption keys are processed by the keystore, parameters may be extracted that may decrease the time required for matching keys to ciphertexts. As non-limiting examples, these parameters can include the functional input type, whether the key is related to an existing key, the time period of the key (if available), whether the key can be designated for cache/offline storage if it meets certain criteria, and other information. For example, if the key corresponds to a CP-ABE (or MA-ABE) scheme, the system can determine whether some attributes on the key overlap with an existing key. If so, the key could be labeled as a related reference to such an existing key. If the key is a KP-ABE scheme, then a small satisfying set of solutions (up to some N) may be enumerated for the key policy. Then other keys can be identified that may have overlapping solutions. As policies are often represented as Boolean formula with support for relational operators, these policies may be processed differently in some cases. For example, if less than or greater than operators are used in the policy, then a SAT/SMT solver (e.g., Microsoft Z3™) can be employed instead to identify satisfying solutions (up to a small N). The details extracted at this stage can be added to the metadata of the key for key filtering purposes during the search.

The keystore may also feature a scheduler that periodically re-processes the keys to update the metadata associated with keys. The re-processing can be performed as keys are updated or on a pre-determined schedule. The system and periodically organize keys within the keystore to enable pruning related or expired keys which may not be useful for decrypting past, present or future ciphertexts (depending on user or application preferences). Furthermore, a key could be re-designated for caching if it has been frequently accessed. For example, when a key is matched with a ciphertext, a counter within the key's metadata can be incremented. During key pre-processing, the keys can be ranked based on this key counter value. Highest ranking keys (up to an arbitrary n) can be stored in the cache to allow for quick retrieval when matching keys to ciphertexts.

Test Key Algorithm

The system can be configured to test and evaluate keys, and in particular to return the first key that satisfies the functional input on the ciphertext. For ABE schemes, the test key algorithm outputs true or false to indicate whether or not a set of attributes satisfies a Boolean formula. In the CP-ABE (or MA-ABE) case, the attributes are on the key and the formula is on the ciphertext whereas, in the KP-ABE case, the formula is on the key and the attributes are on the ciphertext. Based on tree data structure representations of Boolean formula, this algorithm can be implemented as a recursive algorithm. An example algorithm, illustrated in FIG. 3, as TestKeyNode, takes as input the root of a Boolean formula tree, a set of attributes and outputs true or false if the attributes satisfy the given formula.

In the general case of FE schemes, the test key algorithm can be configured to determine whether the function associated with a key produces a desired view type where view types correspond to the different views of the encrypted data.

Key Ranking Algorithm

An example key ranking algorithm is illustrated in FIG. 2. Based on the recorded metadata for decryption keys, the system can be configured to determine one of several key ranking algorithms to try first. In some embodiments, the key ranking algorithm is based on pre-processed information in the keystore for sorting keys as indicated by the search query. For example, keys can be prioritized based on the query and metadata which can include the time period of the key and creation date. Alternatively, keys that are most frequently used (e.g., by key counter) can be prioritized. Keys with more than one related reference to existing keys can also be prioritized. The sorted list of keys can then be tested on the ciphertext using the test key algorithm shown in FIG. 3.

Estimating Decryption Costs

ABE decryption has an associated cost in terms of computational and power resources and memory overhead. For a given ciphertext, these costs can vary depending on the key used. In cases where the search criteria includes finding a key that efficiently decrypts the ciphertext, the costs for decryption can be estimated before attempting decryption. Algorithms and approaches are described herein that can be employed to estimate the decryption costs for multiple keys and then select a key with a relatively lower or a lowest cost.

An example algorithm for estimating the cost of decryption by counting the number of pairings needed in decryption is illustrated in FIG. 4. In some embodiments, pairings are the dominant operation in ABE decryption and the system can be configured to find a key that satisfies the ciphertext while computing relatively refer or the fewest pairings. The cost evaluation algorithm (denoted as EvalNodeCount) can be configured to take as input the root of a Boolean formula tree and a set of attributes and output a pair of a Boolean true or false and a non-negative integer. The Boolean value indicates whether the Boolean formula is satisfied and the integer represents number of pairings. In the illustrated example, the cost evaluation algorithm executes the EvalNodeCount algorithm and outputs the count if the Boolean value is true, otherwise, zero is returned.

FIG. 5 illustrates an example cost evaluation algorithm for estimating the cost of decryption by counting the number of pairings for unique attributes in the Boolean formula. The method operates by returning a set and taking the union of each set while visiting interior gates thereby counting attributes once even if they appear multiple times. The EvalNodeSet algorithm takes as input the root of a Boolean formula tree and a set of attributes and outputs a pair of a Boolean true or false and the satisfying set of attributes. The cost evaluation algorithm executes the EvalNodeSet algorithm and outputs the size of the satisfying set if the Boolean value is true. Otherwise, the empty set is returned.

In some embodiments, the cost evaluation algorithms can include a combination of the key ranking and/or test key algorithms, such as the example of FIG. 2. In these embodiments, either of the above algorithms can be executed on keys to estimate the cost of decryption and in the process create a list of pairing counts for satisfiable keys (e.g., where count is greater than 0). To choose between multiple keys, the search algorithm can output the key reference with a relatively lower or the lowest pairing count.

CP-ABE Scheme and Multiple Ciphertexts

In embodiments where the FE scheme is a CP-ABE scheme and multiple ciphertexts are provided as input, the search algorithm first extracts the policies on ciphertexts and combines the policies with AND gates as follows: $P_1$ AND $P_2$ AND ... AND $P_N$ where N represents the number of ciphertext policies. A SAT solver can be used to simplify this combined policy tree to reduce the test and evaluation cost on the keys. This embodiment can determine which key could satisfy this combined policy (indicating that a user possesses a key that satisfies all N ciphertexts). The next step is to execute the search algorithm, such as that illustrated in FIG. 2 on this combined policy with the given search criteria. Depending on the query, the search function can apply the key ranking algorithm to sort the list of keys accordingly before testing the keys on the combined policy tree. Additionally, depending on whether efficiency of decryption is a requirement, the searchKey algorithm can employ any one of the algorithms shown in FIG. 3, 4 or 5 to find a key that satisfies the policy, reduces, and/or minimizes the decryption costs. Subsequently, the algorithm chooses the key with a relatively lower or the lowest pairing cost (if efficiency is desired). If no such key is found that satisfies all N ciphertexts and the given query, then a key request to the key server can be generated.

Embodiment for a KP-ABE Scheme and Multiple Ciphertexts

In an embodiment where the FE scheme is a KP-ABE scheme and multiple ciphertexts are provided as input, the search can first pre-process the batch of ciphertexts to compute the union of the set of attribute lists on the ciphertexts to find one or more key policies that this union of attributes would satisfy. The algorithm proceeds as shown in FIG. 2 with the exception that the search algorithm applies the exact approach for CP-ABE but in reverse (and using OR gates) as follows: $P_1$ OR $P_2$ OR ... OR $P_N$ where N represents the number of key policies to search. Once all the key policies are combined as such (after ranking/sorting of keys), then the nodes in the tree can be simplified (e.g., using a SAT solver). At this point, the system can test whether the union of attributes on the ciphertexts satisfies this combined policy. If this is the case, then this indicates that one or more of the keys could satisfy all N ciphertexts. The search algorithm can then proceed with testing key policies to determine which one satisfies the union of all attributes on the ciphertexts.

If this test fails, then an alternative approach using SAT can be used to find a possible subset of ciphertexts that could be satisfied with the available keys. This approach includes extracting the policy from the key, then constructing a general input formula that includes the following: $P_1$ OR $P_2$ OR ... OR $P_N$ where N represents the number of key policies to search. Next, the search component provides as input the union of attributes which is associated with two or more ciphertexts and utilizes the solver to reduce the formula based on the existence of these attributes. A SAT solver can be used to determine whether the formula is satisfiable with respect to the attribute list as well as track which policy was satisfied in the process of its reduction. Once a policy within the formula is found satisfiable by the SAT solver, the search component includes the associated key reference in list k. The system can incrementally remove each policy, $P_i$ that was found satisfiable by the SAT solver then re-run the solver to find other satisfiable policies. If one or more are found, the search component can include the associated key reference in a list k. If k contains one or more policies, then this becomes the set of keys that can decrypt two or more ciphertexts. In such a case, the search component either returns k or it constructs a key request that meets the input requirements.

Embodiment for a MA-ABE Scheme and Multiple Ciphertexts

In another embodiment where the FE scheme is a MA-ABE scheme and multiple ciphertexts are provided as input, the search algorithm is configured to perform as in the CP-ABE scheme embodiment. In this case, however, the search component may also return a mapping of attribute strings to authority identifiers that accompanies the selected decryption key reference. This mapping is can be used for correctly decrypting ciphertexts for MA-ABE schemes and can accompany any satisfiable keys that are found during the search.

Other Search Query Combinations

In some cases, a search query combination can be provided including finding a key that both satisfies one or more ciphertexts, yields efficient, reduced effort, or optimal decryption effort, and is within a specific time period. In such cases, the search can combine the algorithms described above to reduce the number of decryption keys based on when the keys were created and the efficiency or optimization of decryption.

If Search Yields No Key

In some cases, there is no such key within a keystore that satisfies the query for decrypting a given ciphertext (in the case of ABE) or for recovering a suitable view of the data (in the general FE case). In this situation, the key manager module may perform a number of possible actions (based on the configuration of the client). As described herein, the system may include a mechanism to determine the necessary attributes, access policy or key function needed to decrypt and then forward that information to a key server. Additionally, this method may forward the search criteria to a key server to validate the key request and return a new key that satisfies the query.

In some cases where there is a large number of keys in a user's keystore, it may be advantageous to quickly determine that no key within a user's keystore satisfies the one or more ciphertexts. The techniques described herein can be used as indicators to determine whether any satisfiable key exists. For example, for the KP-ABE case, the system could combine all key policies, or for the CP-ABE case the system could compute the union of key attributes then test whether this satisfies one or more ciphertexts. If successful, the system can proceed using the search methods described herein. Otherwise, if this test fails, then the client can make a request to the server for the appropriate credentials allowing decryption of the one or more ciphertexts. The server can be configured for returning a key that grants partial or full decryption rights depending on the access permissions of the requesting user.

Example Applications

Various embodiments of the invention are described below as non-limiting examples.

One type of functional encryption is ciphertext-policy ABE (CP-ABE scheme) where a list of descriptive attributes are embedded in the private key. The ciphertext embeds an access policy that determines who can decrypt. In this example, a user or application may search the keystore for a key with a list of one or more attributes that would decrypt the ciphertext. The user or application makes this request to the key manager component with these parameters. In turn, the key manager executes its search algorithm and determines whether a key can be found within the keystore that satisfies the criteria. If one is found, a reference is returned to the user or calling application.

In the context of CP-ABE, a user or application may search the keystore for a key (and associated attributes) that was created in a specific time range or with a recent timestamp that would decrypt the ciphertext. In this embodiment, the search can be for a key from one or more of the previously used keys which successfully decrypted one or more ciphertexts. The user or application makes this request to the key manager component with these parameters. In turn, the key manager executes a search algorithm and determines whether a key can be found within the keystore that satisfies the criteria. If one is found, a reference is returned to the user or calling application.

In the context of CP-ABE, a user or application can search the keystore for the key based on the least number of attributes in the policy that would decrypt the ciphertext. The user or application makes this request to the key manager component with these parameters. In turn, the key manager executes its search algorithm and determines whether a key can be found within the keystore that satisfies the criteria. If one is found, a reference is returned to the user or calling application.

In an embodiment of functional encryption for key-policy ABE (KP-ABE scheme) where an access policy is embedded in the decryption key, the ciphertext embeds a list of one or more descriptive attributes that determines who can decrypt. In this example, a user or application may search the keystore for a key with a list of certain attributes in the policy that would decrypt the ciphertext. The user or application makes this request to the key manager component with these parameters. In turn, the key manager executes its search algorithm and determines whether a key can be found within the keystore that satisfies the query. If one is found, a reference is returned to the user or calling application.

In an embodiment for KP-ABE, a user or application may search the keystore for a key (and an associated policy) that was created in a specific time range or with a recent timestamp that would decrypt the ciphertext. In this embodiment, the system can perform a search for a key from one or more of the previously used keys which successfully decrypted one or more ciphertexts. The user or application makes this request to the key manager module with these parameters. In turn, the key manager executes a search algorithm and determines whether a key can be found within the keystore that satisfies the query. If one is found, a reference is returned to the user or calling application.

In an embodiment for KP-ABE, a user or application may search the keystore for the key based on the least number of attributes that would decrypt the ciphertext. The user or application makes this request to the key manager module with these parameters. In turn, the key manager executes its search algorithm and determines whether a key can be found within the keystore that satisfies the query. If one is found, a reference is returned to the user or calling application.

In an embodiment of functional encryption for multi-authority ciphertext-policy ABE (MA-ABE scheme) where a list of descriptive attributes are embedded in the private key, the ciphertext embeds an access policy that determines who can decrypt. In this example, a user or application can search the keystore for a key with a list of one or more attributes that would decrypt the ciphertext. The user or application makes this request to the key manager module with these parameters. In this case, the attributes may pertain to different authorities and the search component may feature a separate module for enumerating all such authorities. Then, the key manager module executes the search algorithm and determines whether a key can be found within the keystore that satisfies the query. If one is found, a reference is returned to the user or calling application.

In an embodiment for MA-ABE, a user or application may search the keystore for a key (and associated attributes) that was created in a specific time range or with a recent timestamp that would decrypt the ciphertext. In this embodiment, the system can also search for a key from one or more of the previously used keys which successfully decrypted one or more ciphertexts. The user or application makes this request to the key manager module with these parameters. In turn, the key manager executes its search algorithm and determines whether a key can be found within the keystore that satisfies the query. If one is found, a reference is returned to the user or calling application.

In an embodiment for MA-ABE, a user or application can search the keystore for the key based on the least number of attributes in the policy that would decrypt the ciphertext. The user or application makes this request to the key manager module with these parameters. In turn, the key manager executes its search algorithm and determines whether a key can be found within the keystore that satisfies the query. If one is found, a reference is returned to the user or calling application.

In an embodiment of functional encryption which has the ciphertext encrypting a message x, the private key embeds a function F, decrypting this ciphertext with this key recovers the value F(x). In this case, the user or application may search the keystore for a key that recovers some desired function or view of the message x.

Any of the search criteria described herein can be combined with any of the others. For example, in the case of FE, CP-ABE, KP-ABE or MA-ABE, one could be interested in a key that not only produces the most efficient decryption but also was created within a certain date range or one of the previously used keys. Alternatively, if efficiency of decryption is not a priority, a search could be performed for the first key that would decrypt the ciphertext.

In another embodiment, the keystore can be presented with multiple functional inputs corresponding to more than one ciphertext. For example, a search can be performed for the optimal key that decrypts as many ciphertexts as possible in batch mode. This could also be coupled with finding a key that also efficiently decrypts the ciphertexts (or any combination of the above search criteria). In this embodiment, by processing more than one ciphertexts, the search algorithm could learn keys that would enable efficient decryption of several ciphertexts with common characteristics.

System Architectures

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions. Example computerized systems for implementing the invention is illustrated in FIG. 1. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, crossover bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A method for selecting a decryption key for decrypting a functional encryption ciphertext, the method comprising:
    electronically storing one or more decryption key metadata parameters for a plurality of candidate decryption keys for a functional encryption ciphertext;
    storing the functional encryption ciphertext, wherein a first functional input is embedded with the functional encryption ciphertext during encryption and wherein a second functional input is embedded with a decryption key;
    extracting a scheme type of functional input from the ciphertext, wherein the scheme type is indicative of the location of an access control function or an attribute set in the ciphertext or the decryption key;
    extracting the first functional input from the ciphertext;
    searching the metadata parameters to identify a set of candidate keys matching the scheme type of the ciphertext;
    searching the set of candidate keys to identify a key matching the extracted functional input; and
    selecting one of the identified candidate keys matching the scheme type and the extracted functional input as a decryption key for the functional encryption ciphertext.

2. The method of claim 1, further comprising:
    decrypting the functional encryption ciphertext using the selected key; and
    electronically storing the decrypted ciphertext as a plaintext.

3. The method of claim 1, further comprising:
    electronically storing the plurality of candidate decryption keys; and
    extracting the one or more metadata parameters of the plurality of candidate decryption keys.

4. The method of claim 3, further comprising:
    pre-processing the candidate decryption keys to identify the extracted metadata parameters; and
    ranking the decryption keys based on the identified metadata parameters.

5. The method of claim 4, wherein the ranking is based on decryption efficiency, time period for the candidate keys, or a subset of attributes of the candidate keys.

6. The method of claim 1, further comprising:
    if the candidate decryption keys correspond to a ciphertext-policy or multi-authority attribute based encryption scheme, then pre-processing the candidate decryption keys by identifying common attributes among the candidate decryption keys;
    identifying a key having one or more common attributes as a related reference key; and
    storing data representing the common attributes as a metadata parameter of the related reference key.

7. The method of claim 1, further comprising:
    if the decryption key corresponds to a key-policy attribute based encryption scheme then pre-processing the candidate decryption keys by enumerating a set of solutions up to a predetermined n for a key policy and identifying keys that have overlapping solutions; and
    storing data representing the overlapping solutions as a metadata parameter of the identified decryption keys.

8. The method of claim 1, further comprising processing a set of functionalities associated with the candidate decryption keys to identify a first key that satisfies the extracted functional input on the ciphertext.

9. The method of claim 1, wherein the scheme type is one of ciphertext-policy, key-policy, or multi-authority attribute-based encryption.

10. The method of claim 1, further comprising:
    calculating a computational cost of decryption for one or more candidate decryption keys; and
    selecting a candidate decryption key having a lowest computation cost for use as a decryption key.

11. The method of claim 10, further comprising:
    calculating the computation cost by computing a number of pairings required by one or more of the candidate decryption keys to decrypt the ciphertext; and
    selecting the candidate decryption key requiring the lowest number of pairings as the decryption key.

12. The method of claim 1, further comprising:
    determining whether or not a set of attributes associated with the candidate keys satisfies a Boolean formula;
    executing a decryption algorithm with one or more of the candidate keys; and returning a first key that successfully decrypts the ciphertext.

13. The method of claim 1, further comprising:
receiving multiple functional encryption ciphertexts;
extracting a policy from two or more of the ciphertexts;
forming a union of the two or more policies; and
selecting one of the identified candidate keys as a decryption key for the functional encryption ciphertexts if the decryption key satisfies the union of the two or more policies.

14. The method of claim 13, further comprising:
determining a mapping of attribute strings to authority identifiers that are related to the selected decryption key, and wherein the scheme is a multi-authority scheme.

15. The method of claim 1, further comprising caching the selected key by:
each time a key is matched with a ciphertext, incrementing a counter value within the key metadata; and
ranking the identified candidate keys based on the key counter value and storing the relatively higher ranking keys in a cache.

16. The method of claim 1, wherein the metadata comprises one or more parameters selected from key type, time of key creation, key expiration, one or more descriptive textual attributes, or a policy string.

17. The method of claim 1, wherein the functional input embedded within the ciphertext comprises an access control function and the functional input embedded with the decryption key comprises an attribute set.

18. The method of claim 1, wherein the functional input embedded within the ciphertext comprises an attribute set and the functional input embedded with the decryption key comprises an access control function.

19. The method of claim 1, wherein the plurality of candidate decryption keys are electronically stored in a keystore and are represented the form of a series of key/value hash maps.

20. The method of claim 1, further comprising performing a satisfaction analysis test on the ciphertext and each candidate key.

21. A system for selecting a decryption key for a functional encryption ciphertext, the system comprising:
an electronic data store configured for:
electronically storing one or more decryption key metadata parameters for a plurality of candidate decryption keys for a functional encryption ciphertext;
storing one or more functional encryption ciphertexts; and
storing the functional encryption ciphertext, wherein a first functional input is embedded with the ciphertext during encryption and wherein a second functional input is embedded with a decryption key; and
a key processor module configured for:
extracting a scheme type of functional input from the ciphertext, wherein the scheme type is indicative of the location of an access control function or an attribute set in the ciphertext or the decryption key;
extracting the first functional input from the ciphertext;
searching the metadata parameters to identify a set of candidate keys matching the scheme type of the ciphertext;
searching the set of candidate keys to identify a key matching the extracted functional input; and
selecting one of the identified candidate keys matching the scheme type and the extracted functional input as a decryption key for the functional encryption ciphertext.

22. The system of claim 21, wherein the key processor module is further configured for:
decrypting the functional encryption ciphertext using the selected key; and
electronically storing the decrypted ciphertext as a plaintext.

23. The system of claim 21, wherein the keystore is further configured for electronically storing the plurality of candidate decryption keys; and wherein the key processor module is further configured for extracting the one or more metadata parameters of the plurality of candidate decryption keys.

24. The system of claim 23, wherein the key processor module is further configured for:
pre-processing the candidate decryption keys to identify the extracted metadata parameters; and
ranking the decryption keys based on the identified metadata parameters.

25. The system of claim 24, wherein the ranking is based on decryption efficiency, time period for the candidate keys, or a subset of attributes.

26. The system of claim 21, wherein the key processor module is further configured so that if the candidate decryption keys correspond to a ciphertext-policy or multi-authority attribute based encryption scheme then:
pre-processing the candidate decryption keys by identifying common attributes among the candidate decryption keys;
identifying a key having one or more common attributes as a related reference key; and
storing data representing the common attributes as a metadata parameter of the related reference key.

27. The system of claim 21, wherein the key processor module is further configured so that:
if the decryption key corresponds to a key-policy attribute based encryption scheme then pre-processing the candidate decryption keys by enumerating a set of solutions up to a predetermined n for a key policy and identifying keys that have overlapping solutions; and
storing data representing the overlapping solutions as a metadata parameter of the identified decryption keys.

28. The system of claim 21, wherein the key processor module is further configured for processing a set of functionalities associated with the candidate decryption keys to identify the first key that satisfies the functional input on the ciphertext.

29. The system of claim 21, wherein the key processor module is further configured for:
calculating the computational cost of decryption for one or more candidate decryption keys; and
selecting a candidate decryption key having the lowest computation cost as the decryption key.

30. The system of claim 29, wherein the key processor module is further configured for:
calculating the computation cost by computing a number of pairings required by one or more of the candidate decryption keys to decrypt the ciphertext; and
selecting the candidate decryption key requiring the lowest number of pairings as the decryption key.

* * * * *